(12) United States Patent
Alvarado et al.

(10) Patent No.: US 11,461,069 B2
(45) Date of Patent: Oct. 4, 2022

(54) MULTI-CORE AUDIO PROCESSOR WITH DEADLINE SCHEDULER

(71) Applicant: KNOWLES ELECTRONICS, LLC, Itasca, IL (US)

(72) Inventors: Erick Alvarado, Mountain View, CA (US); Xiaojun Chen, Mountain View, CA (US); Dave Rossum, Mountain View, CA (US); Niel Warren, Mountain View, CA (US)

(73) Assignee: KNOWLES ELECTRONICS, LLC., Itasca, IL (US)

( * ) Notice: Subject to any disclaimer, the term of this patent is extended or adjusted under 35 U.S.C. 154(b) by 232 days.

(21) Appl. No.: 16/651,177

(22) PCT Filed: Sep. 24, 2018

(86) PCT No.: PCT/US2018/052348
§ 371 (c)(1),
(2) Date: Mar. 26, 2020

(87) PCT Pub. No.: WO2019/067338
PCT Pub. Date: Apr. 4, 2019

(65) Prior Publication Data
US 2020/0257489 A1 Aug. 13, 2020

Related U.S. Application Data

(60) Provisional application No. 62/566,148, filed on Sep. 29, 2017.

(51) Int. Cl.
*G06F 3/16* (2006.01)
*G05B 19/042* (2006.01)

(52) U.S. Cl.
CPC ............ *G06F 3/16* (2013.01); *G05B 19/042* (2013.01); *G05B 2219/23249* (2013.01)

(58) Field of Classification Search
CPC ........ G06F 9/4887; G06F 3/16; G06F 9/5038; G06F 1/329; G05B 19/042; G05B 2219/23249

(Continued)

(56) References Cited

U.S. PATENT DOCUMENTS

2007/0136729 A1\* 6/2007 Neuman .......... H04N 21/23406
718/102
2009/0055005 A1\* 2/2009 Oxman ................... G10L 19/16
712/36

(Continued)

FOREIGN PATENT DOCUMENTS

WO WO-2016/115000 A1 7/2016

OTHER PUBLICATIONS

Hendry D C ED—Schleif Frank-Michael et al: Comparator trees for winner-take-all circuits, Neurocompu, Elsevier, Amsterdam, NL, vol. 62, Dec. 1, 2004 (Dec. 1, 2004), pp. 389-403, XP004641549, ISSN: 0925-2312, DOI: 10.1016/J.NEUCOM.2004.05.002.\*

(Continued)

*Primary Examiner* — Melur Ramakrishnaiah
(74) *Attorney, Agent, or Firm* — Foley & Lardner LLP (57) ABSTRACT

A multi-core audio processor includes a plurality of audio processing cores having differing capabilities, a plurality of buffers, wherein each buffer is configured to store a plurality of samples associated with a corresponding audio stream, a deadline scheduler including a plurality of deadline registers configured to store a plurality of deadline values for each audio stream, and a plurality of audio processing core interfaces coupling the plurality of audio processing cores to the deadline scheduler, each of the audio processing core interfaces associated with a corresponding audio processing (Continued)

core. The plurality of deadline values indicate an order of processing of samples stored in the plurality of buffers by the plurality of processing cores.

20 Claims, 6 Drawing Sheets

(58) Field of Classification Search
USPC .......................................................... 700/94
See application file for complete search history.

(56) References Cited

U.S. PATENT DOCUMENTS

2016/0098300 A1* 4/2016 Chang .................. G06F 9/4881
                                                                718/103
2016/0210174 A1* 7/2016 Hsieh .................... G06F 1/3206

OTHER PUBLICATIONS

Anonymous: "Processing Audio: Sample by Sample or Buffer by Buffer?", JUCE Forum, Mar. 12, 2017 (Mar. 12, 2017), pp. 1-4, XP055522303, Retrieved from the Internet: URL:https://forum.juce.com/t/processing-audio-sample-by-sample-or-buffer-by-buffer/21306 [retrieved on Nov. 8, 2018].*
Anonymous, "Processing Audio: Sample by Sample or Buffer by Buffer?," JUCE Forum, pp. 1-4 (Mar. 12, 2017).
Hendry, D.C., "Comparator trees for winner-take-all circuits," Neurocomputing, 62, pp. 389-403 (2004).
International Search Report and Written Opinion, PCT/US2018/052348, Knowles Electronics, LLC (Dec. 21, 2018).

* cited by examiner

MULTI-CORE AUDIO PROCESSOR WITH DEADLINE SCHEDULER

CROSS-REFERENCE TO RELATED APPLICATIONS

This application is a National Stage Application of PCT/US2018/052348, filed Sep. 24, 2018, which claims the benefit of and priority to U.S. Provisional Patent Application No. 62/566,148, filed Sep. 29, 2017, the entire contents of which are incorporated herein by reference.

BACKGROUND

The processing of one or more streams of data (e.g., audio data) requires performance of a number of tasks. Scheduling performance of these tasks efficiently in real time in order to satisfy various performance criteria (e.g., latency, power consumption, software/hardware limitations) presents a challenge. Known solutions may not satisfactorily meet all the criteria.

DETAILED DESCRIPTION

The present embodiments will now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the present embodiments. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

Referring generally to the figures, described herein is a multi-core audio processor including a plurality of audio processing cores and a deadline scheduler. The deadline scheduler is configured to maintain a priority list for processing tasks to be performed by a plurality of audio processing cores. In some embodiments, the processing tasks are associated with streams of audio data serviced via the plurality of audio processing cores. As such, the deadline scheduler is configured to determine an order of processing for the streams. In this regard, the deadline scheduler includes a deadline register for each of the streams. The deadline registers store deadline values for corresponding streams. The deadline values indicate a processing order for the streams. As such, by updating the deadline values, the deadline scheduler is configured to dynamically update an order of processing for the streams responsive to various events occurring at the multi-core audio processor.

In another aspect, the deadline scheduler is configured to output vectors to each one of the plurality of audio processing cores. Each vector may include a first value indicating whether one of the streams requires service by the receiving audio processing core. Additionally, each vector may also include a stream identifier associated with a highest priority stream for processing. In one embodiment, the highest priority stream is identified based on the deadline values stored in the deadline registers. In this regard, the deadline scheduler includes a stream prioritization circuit configured to compare the deadline values for the streams to identify the highest priority stream. As such, the deadline schedule facilitates the processing cores efficiently performing various processing tasks.

In another aspect, the multi-core audio processing core may include a transport buffer associated with each stream serviced by the multi-core audio processor. The buffers may be communicably coupled to the deadline scheduler and provide status indications (e.g., empty and full signals) to the deadline scheduler. These status indications may serve as indications of processing urgency for the deadline scheduler. For example, in one embodiment, an empty signal from a transport buffer associated with an output stream serves as an indication of a highest level of processing urgency (herein referred to as "Urgent"). In this example, a full signal from a transport buffer associated with an output stream serves as an indication of a lowest level of processing urgency (herein referred to as Quiescent). In another example, an empty signal from a transport buffer associated with an input stream sis a Quiescent state. The deadline scheduler may update the deadline values based on the status indications received from the transport buffers associated with corresponding streams. As such, the deadline scheduler dynamically updates an ordering of processing tasks based on data communicated with external audio devices to ensure efficient performance of tasks by the audio processing cores.

Figure 1:
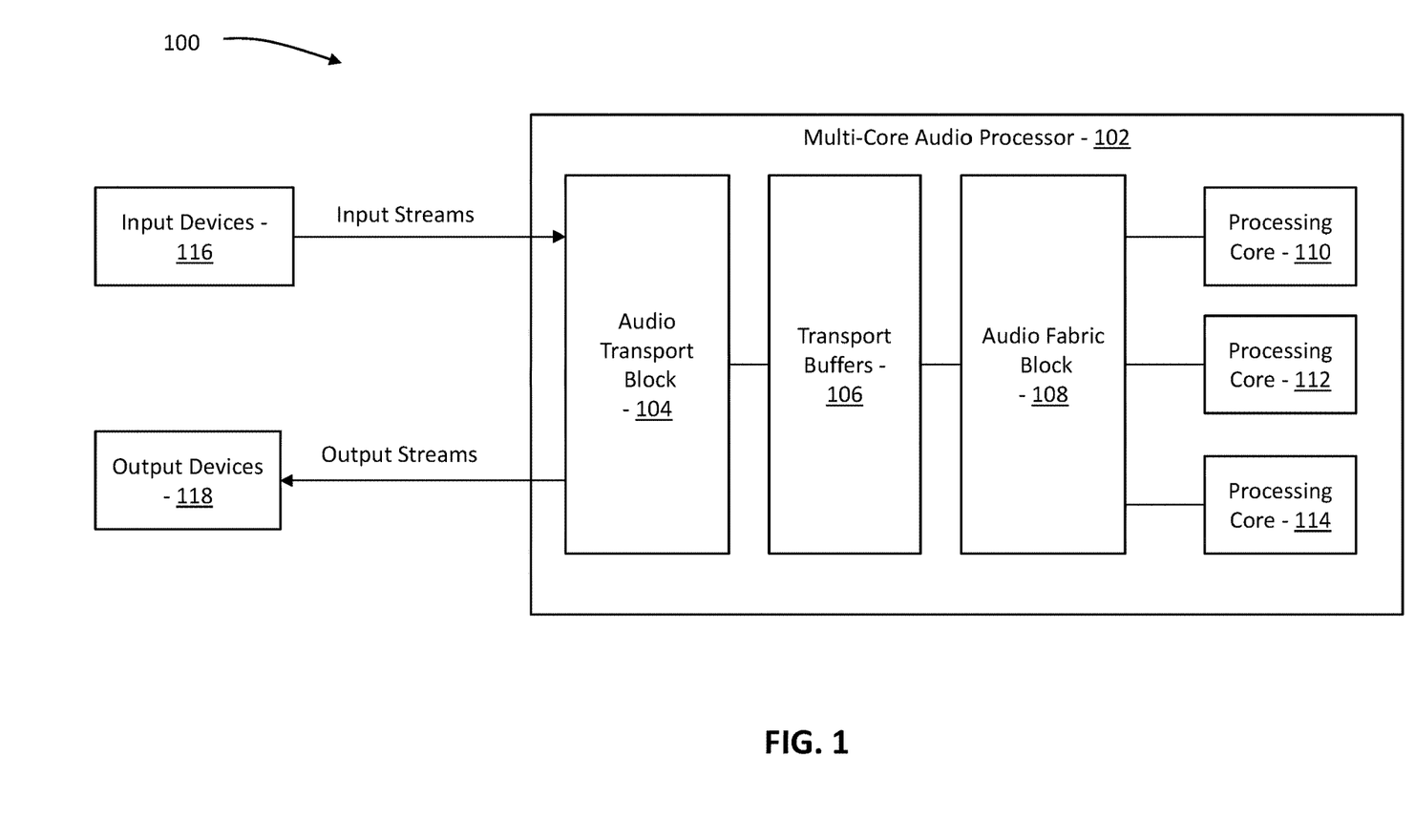
FIG. 1 is a schematic diagram of an environment including a multi-core audio processor.

Referring now to FIG. 1, an environment 100 including a multi-core audio processor 102 is shown, according to an example embodiment. Generally, the multi-core audio processor 102 is configured to receive input streams of data (e.g., audio data) from a plurality of input devices, perform various processing tasks (e.g., noise cancellation, filtering, etc.) on the input streams via a plurality of processing cores 110, 112, and 114, and transmit output streams of data to at least one output device 118. The streams of data communicated between the multi-core audio processor 102 and external devices (e.g., the input devices 116 and the output devices 118) are referred to herein as "physical streams."

Because the multi-core audio processor 102 is servicing multiple streams of data, a plurality of the streams may require service from one of the processing cores 110, 112, and 114 at a particular point in time. Such circumstances require the multi-core audio processor 102 to arbitrate between required tasks. In this regard, the multi-core audio processor 102 includes an audio fabric block 108 including a deadline scheduler. The deadline scheduler is configured to maintain a priority list for various processing tasks for the processing cores 110, 112, and 114. Additionally, the deadline scheduler is configured to identify which of the streams require service and indicate to each of the processing cores 110, 112, and 114 a highest priority stream for service. The operation of the deadline scheduler is described in greater detail herein with respect to FIGS. 3-6.

To identify when the various streams require service, the deadline scheduler communicates with a plurality of transport buffers 106 of the multi-core audio processor 102. The transport buffers 106 serve as queues for unprocessed data received from the input devices 116 and processed data awaiting transmittal to the output devices 118. Transport buffers 106 serve as an interface between an audio transport block 104 and the audio fabric block 108. The audio transport block 104 includes a plurality of interfaces (e.g., audio interfaces) configured to perform operations (e.g., serialization and deserialization, filtering, etc.) on streams after their reception from the input devices 116 and prior to their transmittal to the output devices 118. For example, the audio transport block 104 may include a plurality of pulse code modulation (PCM) interfaces configured to serialize and de-serialize channels of PCM-encoded streams and a plurality of pulse density modulation (PDM) interfaces including cascaded integrator comb (CIC) filter units configured to up-sample or down-sample channels of PDM-encoded streams.

In some embodiments, the multi-core audio processor 102 includes a transport buffer for each interface included in the audio transport block 104. Each transport buffer includes a plurality of asynchronous first-in-first-out (FIFO) buffers. Groupings of the FIFO buffers may be coupled to one another so as to synchronously store data of constituent channels of various streams. Each FIFO buffer may be configured to store a predetermined number of samples (e.g., 2) of each channel of each stream. Thus, whether a particular stream requires service is dependent on a number of samples that an associated grouping of FIFO buffers has stored therein. For example, a grouping of FIFO buffers associated with an input stream is in an Urgent state if each FIFO buffer stores a maximum number of samples (and in a Quiescent state if each FIFO stores no samples). In another example, a grouping of FIFO buffers associated with an output stream is in an Urgent state if each FIFO buffer stores no samples (and in a Quiescent state if each FIFO buffer stores a maximal number of samples). Accordingly, the transport buffers 106 provide status indications (e.g., empty and full signals) regarding numbers of samples stored in the various groupings of FIFO buffers and the deadline scheduler updates outputs provided to the processing cores 110, 112, and 114 based on the status indications to facilitate efficient processing of the streams via the processing cores 110, 112, and 114.

As described herein, each physical stream has an associated identifier. The identifier for a stream may be correlated with the audio interface used to communicate data of the stream. For example, in one embodiment, the audio transport block 104 include six PCM interfaces. If a stream is received by the sixth PCM interface, the stream identifier may identify that interface (e.g., PCM 6). In various embodiments, the audio fabric block 108 is configured to store such identifiers in accordance with a logical address map. For example, each identifier may be stored in a location that identifies the grouping of FIFO buffers storing data of a corresponding stream. This way, upon receipt of an identifier (e.g., from one of the processing cores 110, 112, and 114), the audio fabric block 108 can route data to a requesting processing core. Thus, the audio fabric block 108 facilitates both the scheduling of various processing tasks and the performance of such tasks by routing requisite data between the transport buffers 106 and the processing cores 110, 112, and 114.

The processing cores 110, 112, and 114 may be digital signal processing cores having different processing capabilities. For example, in one embodiment, the processing core 110 is a single sample processing including execution pipelines having instruction sets optimized for processing single samples of the input streams. The processing cores 112 and 114 may be block data processing cores (e.g., frame processing cores) including execution pipelines having instruction sets optimized for block data processing. For example, the processing core 112 may be a high performance frame processing core and the processing core may be a lower performance processing core. The multi-core audio processor may further include non-digital signal processing cores, such as a main controller processor configured to arbitrate undedicated resources (e.g., memory) between the processing cores. The main control processor may be of an ARM architecture. Additionally, a system controller processing core may be configured to handle other tasks (e.g., system wakeup, power down, etc.).

In some embodiments, the processing core 110 is directly connected to the audio fabric block 108 via a native bus of the audio fabric block 108. The other processing cores may be communicably coupled to the audio fabric block by a processor interconnection structure. For example, the processor interconnection structure may couple each of the processing cores of the multi-core audio processor 102 to one another and be coupled to the audio fabric block 108 via a communications bridge.

Figure 2:
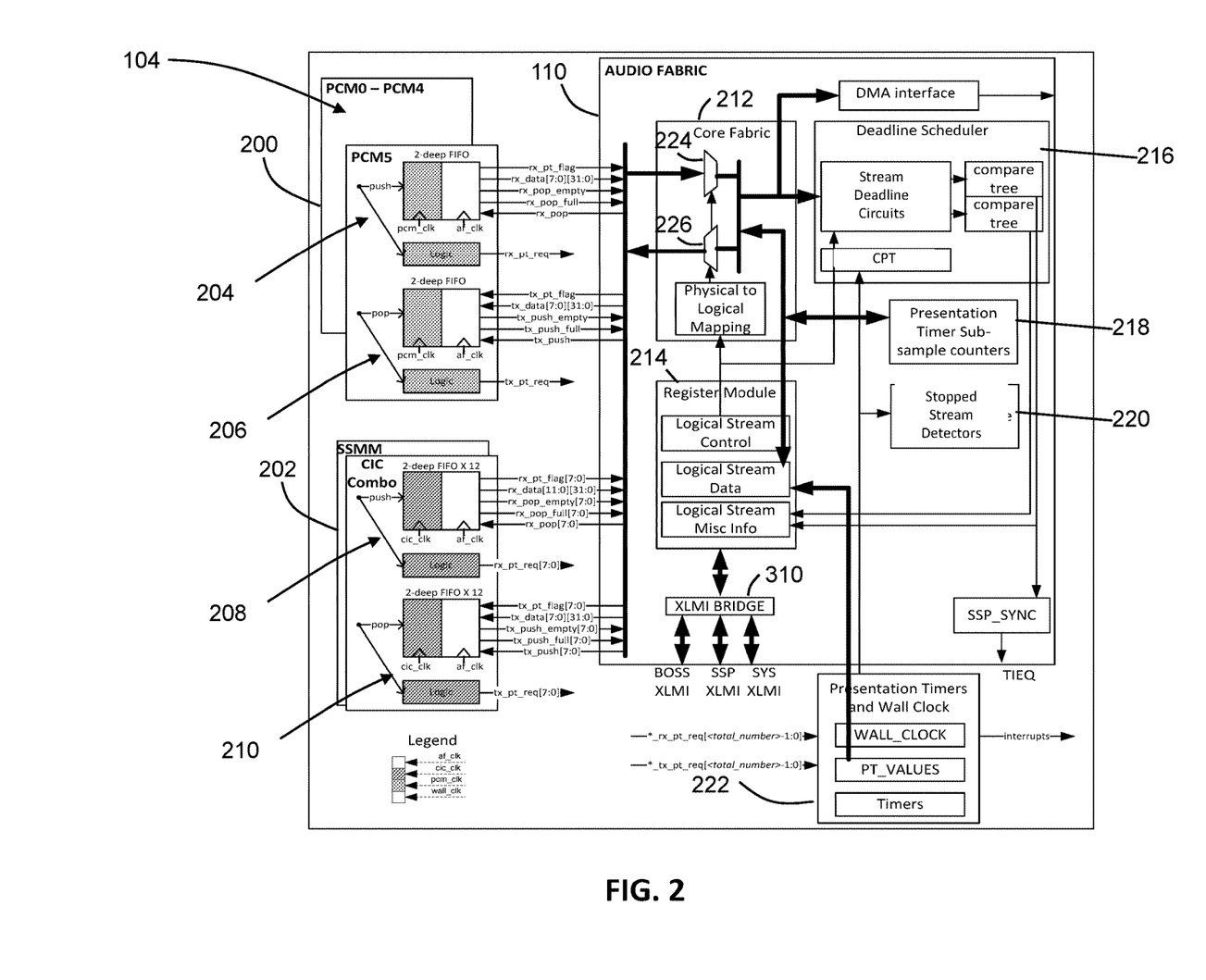
FIG. 2 is a schematic diagram of an audio transport block and an audio fabric block of the multi-core audio processor shown in FIG. 1.

Referring now to FIG. 2, a schematic diagram providing a more detailed view of the audio transport block 104 and audio fabric block 108 described with respect to FIG. 1 is shown. As shown, the audio transport block 104 includes a first set of audio interfaces 200 (e.g., PCM interfaces) and a second set of audio interfaces 202 (e.g., PDM interfaces). While not depicted, additional audio interfaces (e.g., a SLIMbus interface) can also be included. One of the first set of audio interfaces 200 has a receiving transport buffer 204 and a transmittal transport buffer 206 associated therewith. In various embodiments, each audio interface of the first set of audio interfaces 200 has a corresponding receiving and transmitting transport buffer. The receiving transport buffer 204 and the transmittal transport buffer 206 are configurable to include a number of individual FIFO buffers. The number of individual FIFO buffers in a particular transport buffer may correspond to a number of constituent channels of an associated physical stream.

In various embodiments, these constituent channels of the physical streams are digital audio channels. A digital audio channel may be considered a monophonic digital audio signal having a sample rate. As such, the physical streams may be considered a set of one or more associated digital audio channels having the same sample rate (or more specifically, the same sample rate and sample aperture time); the set of samples associated with each channel of a stream may be considered a sample frame.

Channels belonging to the same stream may have consecutive numbers (e.g., corresponding to consecutive individual FIFO buffers in the receiving and transmitting transport buffers 204 and 206). The lowest numbered channel in a stream may be called the head channel of the stream. The individual FIFO buffer associated with the head of stream channel of a stream may be programmed to use its own pointer logic for control its read and write pointer and to export its read and write pointers to all other individual FIFO buffers associated with this stream. Because this arrangement may be programmable, it supports the variable assignment of channels into streams for audio interfaces.

In the example shown, the receiving and transmittal transport buffers 204 and 206 each have a storage depth of two (e.g., have a pair of data registers). As such, the receiving and transmittal transport buffers 204 and 206 (or individual buffers therein) may store up to two samples of audio data. The receiving and transmittal transport buffers 204 and 206 also include logic configured to control the reading and writing of data to and from the data registers. External devices may also control the read and write pointers.

In some embodiments, the individual FIFO buffers of the receiving and transmittal transport buffers 204 and 206 include a write data read output controlled by the write pointer. This write data read output may allow data resulting from the processing of a channel of a first stream to be written to the another FIFO buffer using a write command. When data resulting from the processing of a corresponding channel of a second stream is to be summed with the results of the first stream, the write data read output may provide the first stream channel's data, which may then be summed with the second stream channel's data and written back to the FIFO buffers associated with the first stream using a write command. This supports summing streams using sequential processing.

The transmitting transport buffer 206 includes two data registers, a read pointer, a write pointer, a full bit, and an empty bit. When empty, the read and write pointer may be the same and the full bit is 0. Writing data may go to the register at the write pointer and read data may go from the register at the read pointer. Pushing a write may advance the write pointer. If the write pointer advances to equal the read pointer, the full bit may be set. Popping may advance the read pointer and clear the full bit.

In various embodiments, the logic of the transport buffer 206 decouples the writing of data from the pushing of write data based on the timeliness of service from the processing cores. For example, the transmitting transport buffer 206 may request service when a pop occurs and the FIFO is not full (i.e., when a sample is output to the audio transport block 104 during a time when only one of the data registers stores data). At this point, the write pointer may point to the previously read data (to an empty register). If the requested service is timely (i.e., if one of the processing cores writes data to the transport buffer 206 in response to the service request), the write pointer may be pushed to fill the other data register once data is written. However, if service is not timely (i.e., if data is not written to the initial data register within a predetermined period), the write pointer is not pushed such that another pop may occur and the FIFO is empty, and the situation may be, for writes at least, unchanged. As such, the filling of the transmitting transport buffer is dependent on the timeliness of service from the processing cores.

The receiving transport buffer 204 may operate in a similar manner. For example, data received via the transport block 104 may be pushed to a data register at the write pointer and a push operation may advance the write pointer to another data register. Once filled (i.e., once another sample is written to the second data register), the receiving transport buffer 204 may provide a full bit signal of 1 and an empty bit signal of 0 to the audio fabric block 108 (i.e., to request service from one of the processing cores). Additionally, the receiving transport buffer 204 is configured to receive pop commands issued via one of the processing cores to enable the reading of data stored therein. In some embodiments, the receiving transport buffer 204 is configured to cause the deadline scheduler to request service when a push occurs when not in the Quiescent state.

In the example shown, the second set of audio protocol interfaces 202 includes a receiving transport buffer 208 and a transmittal transport buffer 210 associated therewith. The buffers in the sets receiving and transmittal buffers 208 and 210 are similar in structure and function to the receiving and transmittal transport buffers 204 and 206 described herein.

The audio fabric block 108 is communicably coupled to the transport buffers. In a first aspect, the audio fabric block 108 is configured to route various signals (e.g., data, presentation time flags described herein, pop and push commands, empty and full indications, etc.) between the transport buffers and the processing cores to, for example, provide access to the data stored in the transport buffers for further processing. In this regard, the audio fabric block 108 includes a core fabric 212 and register module 214. The register module 214 is configured to store physical stream identifiers in accordance with an address map to facilitate proper data routing between the transport buffers and the processing cores.

In various embodiments, the register module 214 is configured to provide a mapping for sixteen potential logical streams. As described herein, "logical streams" correspond to data stored in association with a logical address map used by the processing cores (e.g., via queue interfaces) to retrieve data from the transport buffers. Logical streams may correspond to received streams (i.e., physical streams received via the audio transport block 104) or transmitted streams (i.e., physical streams transmitted via the audio transport block 104). The mapping may be based on the configuration of the transport buffers. As described herein, a particular transport buffer includes individual buffers grouped together based on a number of channels contained in a physical stream. Accordingly, a physical stream identifier may identify a particular transport buffer, a head of stream buffer within the transport buffer, and a number of channels associated with the physical stream. The audio fabric block 108 is configured to receive physical stream identifiers from the processing cores (e.g., via queue interfaces thereon), identify locations within the transport buffers based on the received physical stream identifiers, and enable select lines of routing multiplexers 224 and 226 contained in a core fabric 212 such that signals are routed between the identified locations and the requesting processing core.

In this regard, the core fabric 212 may include a set of comparators configured to enable select lines of the routing multiplexers 224 and 226 responsive to receiving a physical stream identifier stored in a corresponding register of the register module 214. To provide an illustrative example, the processing core 110 may request to service a physical stream stored in the receiving transport buffer 204 by providing an associated physical stream identifier to the audio fabric block 108. Based on the received physical stream identifier, the comparators in the core fabric 212 associated with a register in the register module 214 storing the physical stream identifier enable select lines of the routing multiplexer 226 such that a signal (e.g., POP command) is routed from the processing core 110 to the receiving transport buffer 204. In response to the POP command, the receiving transport buffer pops data stored in the registers identified by the physical stream identifier. Select lines associated with the routing multiplexer 226 are also enabled by the comparators so as to route the popped data to the processing core 110.

Figure 3:
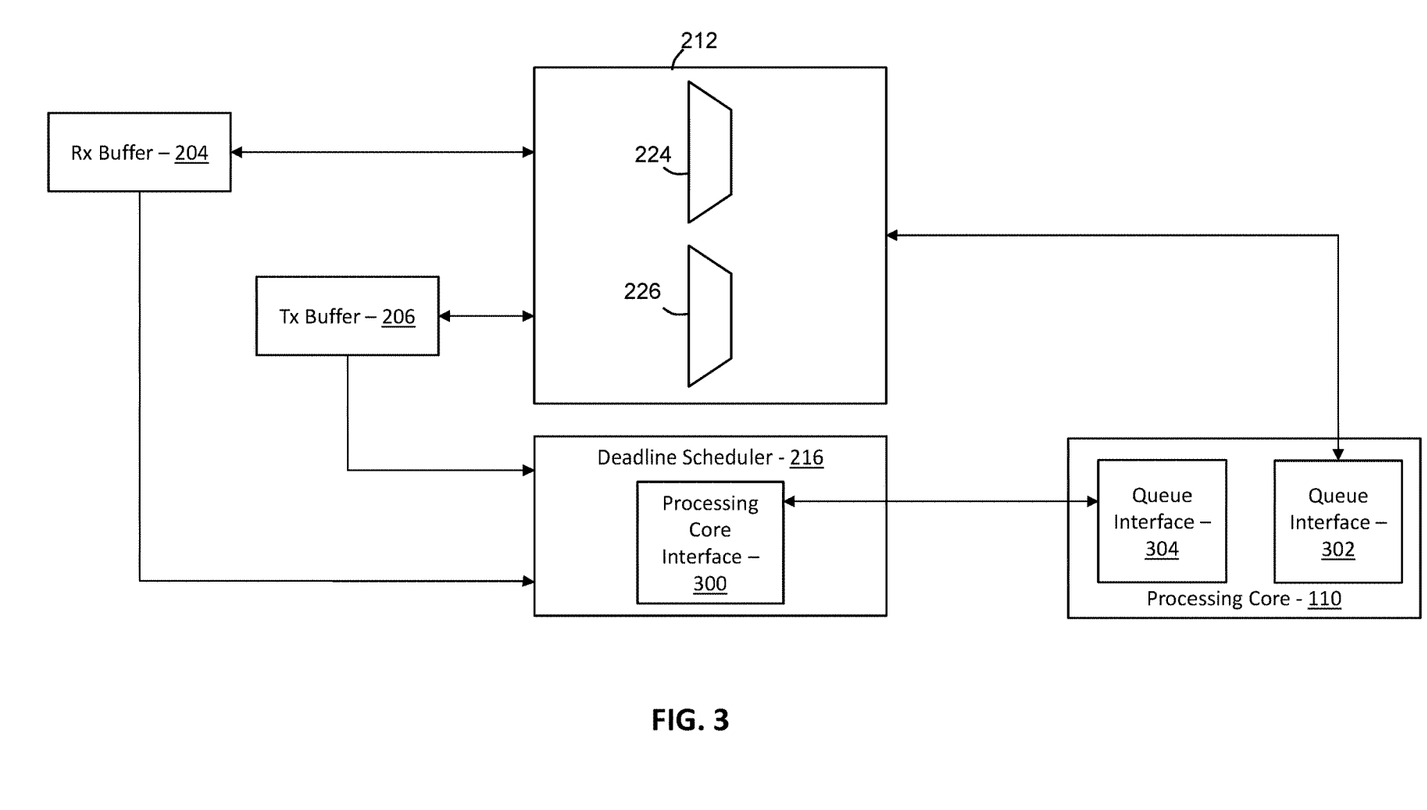
FIG. 3 is a schematic diagram showing interconnections between transport buffers, a deadline scheduler, and a processing core.

Still referring to FIG. 3, the logic of the receiving and transmittal transport buffers 204 and 206 is configured to request presentation times from a presentation timer 222. In some embodiments, the receiving and transmittal transport buffers 204 and 206 are configured to request a presentation time each time data is stored therein. The presentation timer 222 is communicably coupled to a set of sub-sample counters 218. The sub-sample counters 218 are configured to increment upon receipt of the presentation time requests from the receiving and transmittal transport buffers 204 and 206 (and any other transport buffers included in the multi-core audio process). In an example, upon a sub-sample counter associated with the receiving transport buffer 204 reaching a predetermined level (e.g., associated with a sub-sample ratio stored in a data register of the sub-sample counter), the presentation timer 222 is configured to provide a presentation time flag input to the receiving transport buffer 204. In response to the presentation time flag inputs, the receiving and the transmitting transport buffers 204 and 206 are configured to cause the times to travel through the buffer with a stored sample. As such, the receiving transport buffer 204 is configured to provide a presentation time flag to the audio fabric block 108 when the associated sample is popped therefrom. This enables the processing cores identify time differences between the samples in the various physical streams.

In an example with the transmitting transport buffer 206, the presentation time flags travel with the sample through the transmitting transport buffer 206. As such, the presentation time flags are generated by the presentation timer 222 on the input side of the transmitting transport buffer 206. Hence, the presentation time flag input may not reach the audio clock domain for some number of samples after the tagged sample. Given this, once an associated sub-sample counter reaches a predetermined number, the next sample written to transmitting transport buffer 206 will not receive a presentation time, as the input flag will net yet have reached the transmitting transport buffer 206. Thus, the multi-core audio processor 102 may implement a strategy in which a subsequent sample that is N samples after the flagged sample be provided a presentation time.

The following sequence may be used to implement such a strategy. A sub-sample counter 218 may increment every time a sample is written into the transmitting transport buffer 206. In the example shown, the transmitting transport buffer 206 has a depth of two samples. As such, initiating from an empty state, the transmitting transport buffer 206 may receive a first sample from one of the processing cores, causing sub-sample counter 218 to increment. After this, the first sample may be provided to an audio interface for transmission. Alternatively, a second sample may be written to the transmitting transport buffer 206. At this point, the transmitting transport buffer 206 is full and the sub-sample counter may increment again. At various increments of the sub-sample counter 218, the presentation time counter may provide a presentation time flag input to the transmitting transport buffer 206, causing the transmitting transport buffer 206 to assert a presentation time flag after a subsequent sample is written to the sub-sample counter 218.

To provide such a sequence, the sub-sample counters 218 for each physical stream may include a sub-sample register and a counter. The sub-sample register may store predetermined sub-sample ratios for a particular physical stream. Corresponding counters may utilize the sub-sample ratios as reload values. As such, the counters may start at the desired sub-sample ratio and count down with each sample written to the transmitting transport buffer 206. When zero is reached, the presentation timer 222 may provide a presentation time flag input to the transmitting transport buffer 206 indicating that the next sample written to the transmitting transport buffer 206 requires a presentation time. At this point, the counter is re-set to the sub-sample ratio. Thus, when the counter is re-set, the transmitting transport buffer 206 asserts a presentation time flag, causing a presentation time to be asserted along with the next sample. Thus, by configuring the sub-sample ratios stored in the registers of the sub-sample counters 218, the relative frequency of the provision of presentation time flags along with samples transmitted from the transmitting transport buffer 206 may be varied. The presentation timer 316 may work in a similar manner with respect to the receiving transport buffer 204.

In various embodiments, the presentation times provided via the presentation timer 222 are 64 bit values, representing the 64 bit wall clock value of an associated sample frame. In some embodiments, the lowest sub-sampling ratios employed by the sub-sample counters 218 is four. The maximum sub-sampling ratio employed may be $2^12$ sample frames.

In some embodiments, the sub-sample counters 218 are controlled by two registers per stream. For the receiving transport buffers 204, this may be done on a physical stream basis. For the transmitting transport buffers 206, this may be done on a logical stream basis. One register of the sub-sample counters 218 may determine the sub-sample period (e.g., a number from 4 to $2^12$) for a current sample. The other register may be used to reduce or increase the sub-sample period for the next sample. This may allow the "phase" of the sub-sampling to be adjusted. The relation of the initial sub-sampling phase to stream initiation may be well defined. Which sample frames are associated with presentation times may be indicated to the first processing core 110 through a vector supplied by the deadline scheduler 216 via a processing core interface employed therein.

The audio fabric block 108 further includes a deadline scheduler 216. The deadline scheduler 216 is configured to maintain a priority list of processing tasks for physical and logical streams. Generally, the deadline scheduler 216 is configured to receive the empty and full indications from the transport buffers as inputs and provide a vector to each of the processing cores as outputs. In various embodiments, this vector includes at least three values. A first of these values may include a single bit SVC_REQ signal indicating that at least one stream requires service based on the received empty and full indications. A second of these values may be a single bit PT_FLAG signal, indicating that the at least one stream that requires service is associated with a presentation time. Thus, when the presentation timer 222 asserts the presentation time flag input (e.g., in response to a sub-sample counter 218 incrementing to a predetermined value associated with a desired sub-sample ratio), the presentation time flag input may also be provided to the deadline scheduler 216, causing the PT_FLAG signal to be affirmatively asserted. A third value output by the deadline scheduler 216 may include an physical stream identifier of a stream having a highest priority for service. To identify a stream having the highest priority, the deadline scheduler 216 includes a plurality of stream deadline circuits and compare trees. The structure and function of the stream deadline circuits and compare trees are described in more detail with respect to FIGS. 4-5. The audio fabric block 108 further includes a stopped stream detectors 220 (e.g., a stopped stream detector associated with each stream). Generally, each stopped stream detector 220 is configured to determine whether a corresponding stream has ceased to be transported via the audio transport block 104 or if a sampling rate for any of the streams has significantly decreased. The structure of a stopped stream detector is described in more detail with respect to FIG. 6.

FIG. 3 is a schematic diagram showing interconnections between transport buffers, a deadline scheduler, and a processing core. As will be appreciated, various components and interconnections are left out of FIG. 3 for the purposes of illustration. As shown, the processing core 110 includes a first queue interface 302 and a second queue interface 304. Via the first queue interface 302, the processing core 110 is communicably coupled to the core fabric 212. Thus, via the queue interface 302 the processing core 110 is able to communicate with the transport buffers (e.g., the receiving and transmitting transport buffers 204 and 206) via the routing multiplexers 224 and 226 of the core fabric 212.

Via the second queue interface 304, the processing core 110 receives the vector output by the deadline scheduler 216. Thus, the second queue interface 304 enables the processing core 110 to "peek" at the head the queue of processing tasks maintained by the deadline scheduler 216 to determine if a stream or background task requires processing or read the head of the queue. If the head of queue is not a valid stream or background process requiring service, the second queue interface 304 may stall the processing core 110 in a very low power state until the head of queue becomes a valid stream or background task requiring processing. In various embodiments, when the head of queue is read, the queue interface 304 may provide the processing core 110 with an acknowledgment signal (ACK) signal, indicating the head of queue has been accepted for service. When read or peeked, the queue interface 304 may provide a designator of the priority stream or background task requiring processing, as well as an indicator as to whether the sample frame of the stream is associated with a presentation time.

In various embodiments, the first and second queue interfaces 302 and 304 each include a plurality of stream registers storing the stream identifiers associated with each logical stream described herein. By communicating the stream registers stored in the queue interface 302 and 304, the processing core 110 is able to read data from or write data to the transport buffers via the core fabric 212.

In various embodiments, in addition to the first processing core 110, the second processing core 112, and the third processing core 114 include a pair of queue interfaces. In some embodiments, additional processing cores (e.g., the central controller processor and the system controller processor) include interrupt and register (I+R) interfaces performing similar functions as the first and second queue interfaces 302 and 304.

The deadline scheduler 216 is also communicably coupled to each of the transport buffers to receive status indicators (e.g., empty signals, full signals, etc.) therefrom.

Additionally, the deadline scheduler 216 may also accept an ACK pulse from processing core's queue or I+R interface indicating that the a stream (e.g., the stream associated with an identifier output via the deadline scheduler 216) has been accepted for service. This signal may indicate that the corresponding event for that stream may be dropped from the priority list. An I+R interface may also accept a designator indicating which a stream or the background task has been accepted for service.

Figure 4:
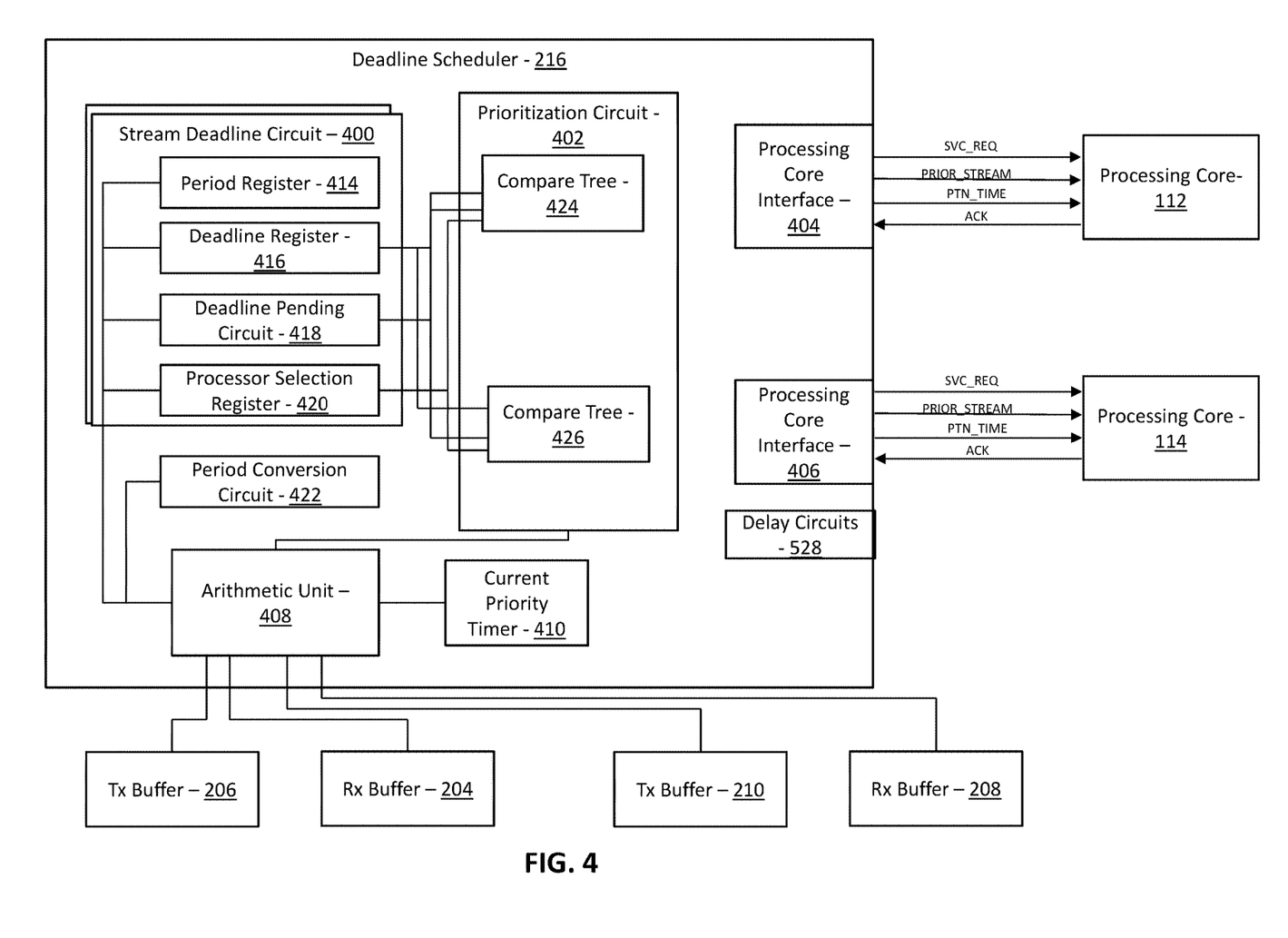
FIG. 4 is a schematic diagram of a deadline scheduler of a multi-core audio processor.

FIG. 4 is a schematic diagram of the deadline scheduler 216. As will be appreciated, various components and interconnections are left out in FIG. 4 for purposes of illustration. As shown, the deadline scheduler 216 includes a plurality of stream deadline circuits 400, a prioritization circuit 402, processing core interfaces 404 and 406, an arithmetic unit 408, a current priority timer 410, and a period conversion circuit 422.

The current priority timer (CPT) 410 is a counter configured to increment at a predetermined rate. For example, in some embodiments, the CPT sequentially increments from zero at initiation at a rate of 3.072 MHz. As described herein, the CPT 410 is used by the deadline scheduler 216 to update delay values stored in deadline registers 416 associated with the various streams The deadline scheduler 216 further includes a stream deadline circuit 400 for each stream. Each stream deadline circuit 400 includes a period register 414. In some embodiments, the period registers 414 are 5 bit registers. The first 2 bits may indicate a corresponding stream's sample rate family. For example, a first stream belonging to a first sample rate family may have a sampling rate of 4 kHz, a second stream belonging to a second sample rate family may have a sampling rate of 5.5125 kHz, a third stream belonging to a third sample rate family may have a sampling rate 6 kHz, other streams may be deactivated and associated with a stream off sampling rate family. Thus, based on the values of the first two bits of a period register 414, the sampling rate family of a corresponding stream may be identified. The remaining three bits of each period register 414 may indicate a multiplier for the sample rate stored in the first two bits. For example, a stream in the third sampling rate family may have any multiplier associated therewith to specifically specify that the sampling rate of the corresponding stream is one of 6, 12, 24, 48, 96, 192, 384, or 768 kHz, and so on. With this structure, the period registers 414 specify a plurality of possible sample rates for the streams.

Each stream deadline circuit 400 may also include a deadline register 416 storing deadline values for the corresponding stream. The deadline values may start at initial values for each stream and be updated by the deadline scheduler 216 depending on data stored in the transport buffers and the processing cores accepting the streams for service. For example, the deadline scheduler 216 may include an arithmetic unit 408 configured to add various values described herein to deadline values stored in the deadline registers 416 responsive to streams being serviced by the processing cores. In various embodiments, the deadline values indicated by the deadline registers 416 may be in 1/3072 kHz=325.52 nsec units, modulo 1333 µsec=4096*325 nsec.

In various embodiments, an XOR operation between the deadline values and the value of the CPT 410 is used to set the deadline values stored in the deadline registers 416. For example, in one embodiment, the CPT 410 and the deadline registers 416 are both 12 bits, potentially representing a time period of 1333 µsec. In this embodiment, the shortest sampling rate (e.g., stored in the period registers 414) may be 4 kHz and the longest allowable deadline for the deadline registers 416 represents 2 such periods or 500 μsec beyond the increment of the CPT 410. Thus, when the CPT 410 starts at zero, all the deadline registers 416 may contain values between 0 and 500 μsec. As the CPT 410 increments, the valid deadline values may increase, and their unsigned values may result in valid comparisons. When the time represented by the CPT 410 reaches 666 μsec, all deadline registers 416 may contain values greater between 666 μsec and 1156 μsec (i.e. values with their most significant bit (MSB) set to 1). At this point, the MSB of all valid deadline registers 514 may be inverted by an XOR operation with the MSB of the CPT 510. This enables continued incrementing and valid comparison between the deadline values. When the CPT 410 wraps back to 0, all the deadline registers 416 may contain values with their MSB equal 0. At this point the MSB may be un-inverted without effect on the comparison, and the cycle may continue.

Each stream deadline circuit 400 may also include a deadline pending circuit 418. The deadline scheduler 216 may switch the deadline pending circuits 418 from a valid to an invalid state after a stream is serviced. In some embodiments, the deadline pending circuits are flip-flops. Each stream deadline circuit 400 may also include an action request circuit (e.g., flip-flop, not depicted) switched to an affirmative state when action is required by the arithmetic. Additionally, each stream deadline circuit 400 may also include a processor selection register 420, identifying one of the processing cores that are to service the corresponding stream.

Each stream deadline circuit 400 may also be communicably coupled to a period conversion circuit 422. The period conversion circuit 422 is configured to convert the sampling rates stored in the period registers 414 to corresponding stream periods (e.g., 10 bit values). In some embodiments, the period conversion circuit 422 includes a read-only memory (ROM). The stream periods for each physical stream are stored in the ROM in accordance with a stream address map. In this regard, the period conversion circuit 422 may include address decoding logic configured to enable an addressing multiplexer to route a stream period value to the arithmetic unit 408 in response to receiving a corresponding stream identifier. For example, in response to a processing core servicing a stream (e.g., reading data from a transport buffer), the arithmetic unit 408 may issue a corresponding stream identifier to the period conversion circuit 422 to retrieve the corresponding period value and add the period value (or an integer multiple thereof) to a deadline value stored in a corresponding deadline register 416.

In some embodiments, the arithmetic unit 408 is an adder which sums the ROM output (sometimes doubled, as described herein) of the period conversion circuit 422 with either the CPT 410 value or the value of a corresponding stream's deadline register 416, and writes this sum back to the deadline register 416. The arithmetic may be non-saturating.

The deadline scheduler 216 also includes a prioritization circuit 402. The prioritization circuit 402 includes plurality of compare trees (e.g., on compare tree for each audio processing core). As shown, the prioritization circuit 402 includes a first compare tree 424 for the first processing core 110 and a second compare tree 426 for the second processing core 112. The compare trees are circuits with comparative logic configured to identify a stream having a corresponding deadline register 416 having a lowest deadline value stored therein.

Figure 5:
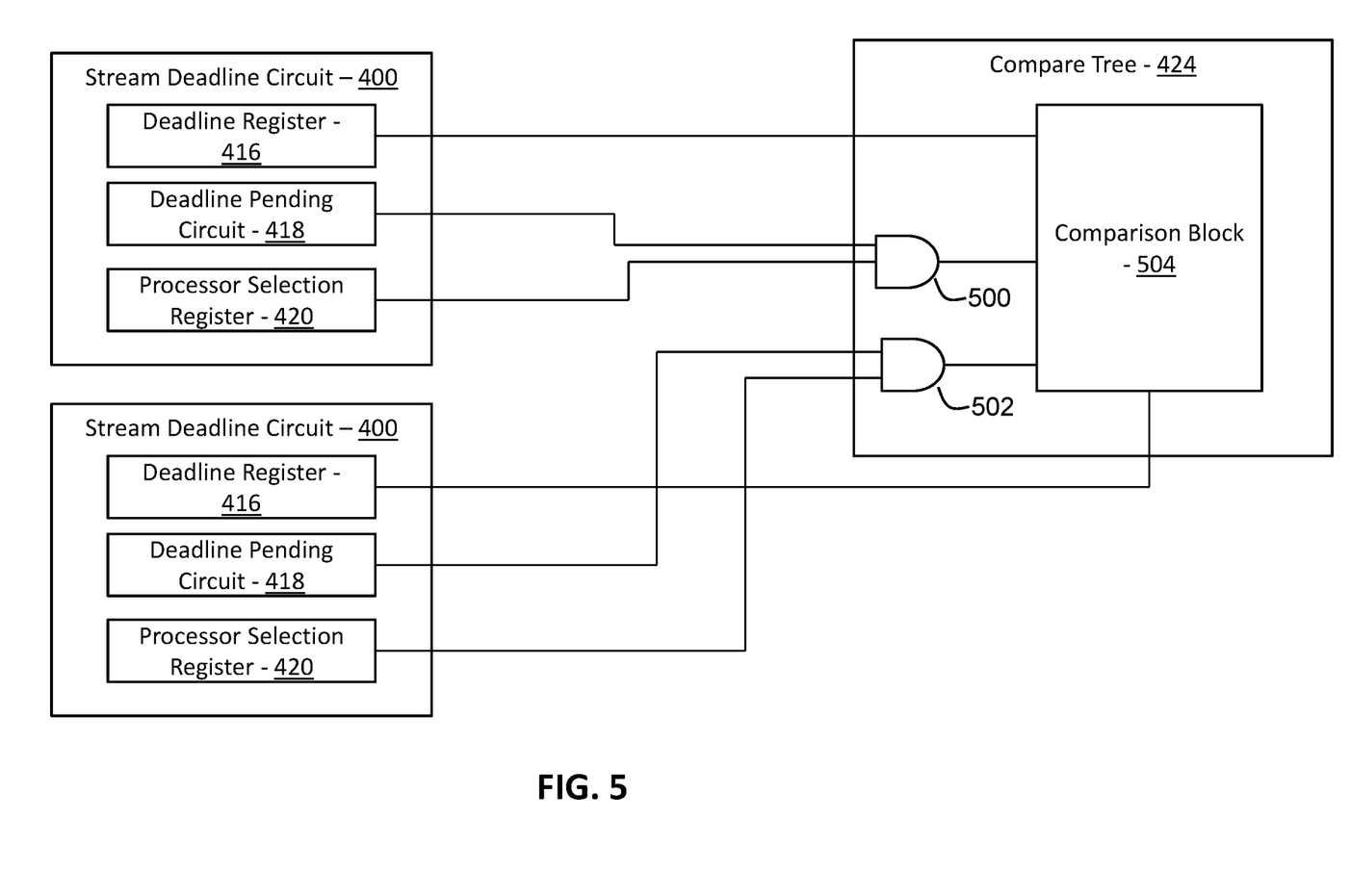
FIG. 5 is a schematic diagram showing interconnections of a compare tree of the deadline scheduler shown in FIG. 4.

Referring to FIG. 5, a schematic diagram illustrating the operation of the compare tree 424 is shown. In the example shown, the compare tree is communicably coupled to two stream deadline circuits 400. It should be understood that the, in examples with greater number of streams, that the compare tree 424 may be communicably coupled to greater numbers of stream deadline circuits 400. For example, when there are sixteen streams, the compare tree 424 is communicably coupled to sixteen stream deadline circuits (and includes sixteen logic units, similar to the logic units 500 and 502 described herein).

As shown, the compare tree includes a first logic unit 500 communicably coupled to a first stream deadline circuit 400 and a second logic unit 502 communicably coupled to a second stream deadline circuit 400. Logic units 500 and 502 take the status of a deadline pending circuit 418 and the value stored in the processor selection register 420 as inputs and provide a VALID signal as an output to a comparison block 504. In an example, the logic unit 500 takes the logical AND between the status of the deadline pending circuit 418 and the value stored in the processor selection register 420. In this example, if the processor selection register 420 stores a value corresponding to the processing core 110 (i.e., the processing core associated with the compare tree 424) and the deadline pending circuit is in the affirmative state, the logic unit 500 positive asserts the VALID signal to the comparison block 504.

The comparison block 504 compares the deadline values in the deadline registers 416. The comparison block 504 identifies lowest deadline value and outputs a stream identifier associated with that lowest deadline value to the processing core 110 (e.g., via a processing core interface of the deadline scheduler 216). In various embodiments, deadline registers 416 are only compared with one another if they both have a VALID signal asserted by a corresponding logic unit. This way, only streams with both a valid deadline and set for processing by a corresponding processing core are identified to the processing core.

If additional stream deadline circuits 400 are coupled to a compare tree, that compare tree may include additional comparison blocks. In an example, if four stream deadline circuits 400 are coupled to the compare tree 424, the compare tree may include two stages of comparison blocks. A first stage may include two comparison blocks similar to the comparison block 504 described herein. Each comparison block of the first stage may be communicably coupled to a pair of stream deadline circuits 400 (e.g., receiving VALID symbols from logic units and the deadline values stored in the deadline registers 416) and output a lowest deadline value. The second stage may include a single comparison block receiving the deadline values output by the comparison blocks of the first stage. In an example where there are eight stream deadline circuits 400 coupled to the compare tree 426, three stages of comparison blocks, containing eight, four, and two comparison blocks, respectively.

Figure 6:
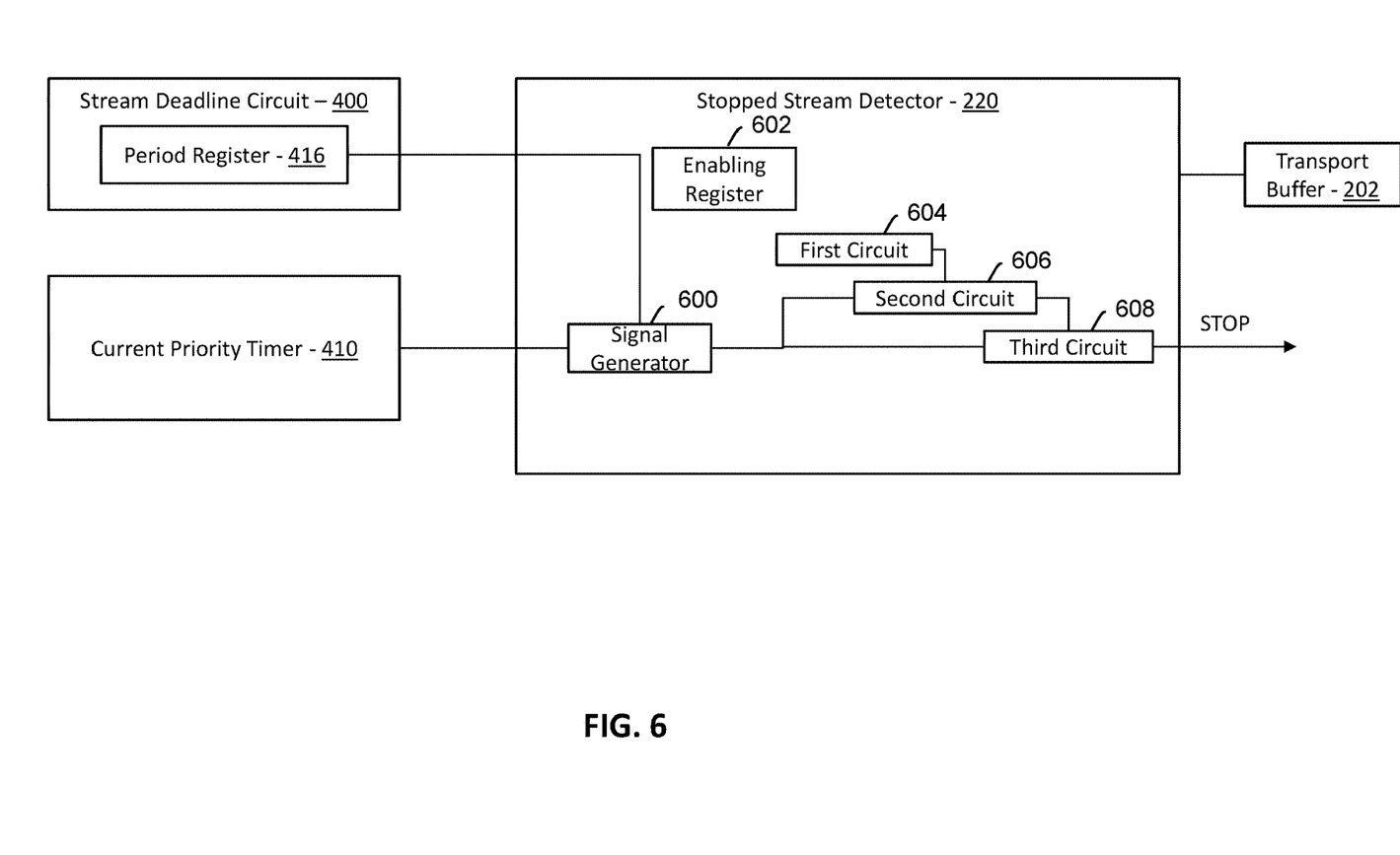
FIG. 6 is a schematic diagram of a stopped stream detector.

Referring now to FIG. 6, a schematic diagram of one of the stopped stream detectors 220 is shown. The stopped stream detector 220 shown is associated with a stream assigned to the receiving transport buffer 204 described with respect to FIG. 2. As such, the stopped stream detector 220 is communicably coupled to the receiving transport buffer 204 (e.g., connected with empty bit, the full bit, and the POP output). As will be appreciated, other stopped stream detectors 220 included in the audio fabric block 108 may be coupled with different transport buffers associated with different streams.

From the receiving transport buffer 204, the stopped stream detector 220 may receive event pulses (e.g., from the empty, full, and POP signals). To illustrate, an event pulse may correspond to a trailing edge of an empty signal or a leading edge of a full signal (i.e., indicating storage of a sample in the corresponding transport buffer).

In various embodiments, the stopped stream detectors are also communicably coupled to an additional processing core (e.g., the system controller processing core described with respect to FIG. 1). For example, each stopped stream detector may be configured to provide a STOP signal to the system controller processing in response to determining that a stream has ceased to be transported. The STOP signal may be a pulse, but since it crosses an asynchronous boundary and indicates an event, it may be encoded such that any transition indicates a timeout. In response, the system controller processing core may prevent further transport of the stream.

As shown, the stopped stream detector 220 includes an enabling register 602, a first circuit 604, a second circuit 606, and a third circuit 608. In an embodiment, the first, second, and third circuits 602, 604, and 606 are flip flops. The enabling register 602 may be programmed with a first value (e.g., 1) when stopped stream detection is enabled. The first circuit 604 is initially cleared, but is switched to an affirmative state whenever the enabling register is programmed with the first value and an event pulse is received from the receiving transport buffer 204. The second circuit 606 is initially cleared, but is switched to an affirmative state whenever the enabling register is programmed with the first value, the first circuit is in the affirmative state, an event pulse from a corresponding transport buffer is not asserted, and a combinatorial signal is received from a signal generator 600. Additionally, once an event pulse is received from a corresponding transport buffer, the second circuit is re-set back to the non-affirmative state.

The signal generator 600 is communicably coupled to the period register 414 associated with the stream and the CPT 410. The signal generator 600 may assert an affirmative value when the CPT outputs a value of N−M, where M is the multiplier stored in the period register 414 and N is a predetermined value (e.g., 9). For example, the signal generator 600 may a generate periodic signal having a period between 4/3 and twice the period of the associated stream. As a result, the second circuit 606 only periodically reaches an affirmative state.

The third circuit 608 is initially cleared and switched to an affirmative state only if the enabling register is programmed with the first value, the second circuit 606 is in the affirmative state, and the periodic signal is asserted. In various embodiments, the STOP signal is output from the stopped stream detector when the third circuit 608 is in an affirmative state. Thus, the STOP signal may be asserted when the period between event pulses received from a corresponding transport buffer exceeds 4/3 the sampling rate multiplier stored in a corresponding period register 414. The STOP signal is certainly asserted when the period between event pulses exceeds 3 times the sampling rate multiplier. In some embodiments, to clear the STOP signal, the enabling register must be cleared.

A prioritization scheme for various actions that may be taken by the deadline scheduler 216 is now described. In various embodiments, a variety of events, all of which may potentially occur simultaneously, may trigger actions by the arithmetic unit 408. The deadline scheduler 216 may note the occurrence of each such event via a set of flip flops. For example upon the occurrence of a particular event, a corresponding flip flop in the set may be switched such that the deadline scheduler 216 notes the timing of its occurrence. This enables simultaneous events to be handled sequentially. Alternatively, instead of having a single arithmetic unit 408, each stream deadline circuit 400 may include a separate adder, thereby enabling multiple deadlines associated with multiple streams to be updated at the same time. Example events that may affect a stream's deadline register 416 or deadline pending circuit 418 are summarized in the table below.

TABLE 1

| Event | Deadline Scheduler Action |
| --- | --- |
| 1. A stream initially in the Quiescent state becomes negated (e.g., a full signal associated with an output stream becomes negated). | A. The arithmetic unit 408 adds the current value of the CPT 410 plus twice the period value for the stream stored in the period conversion circuit 422 to the stream's deadline register 416. This may be the normal action when a stream requires service. This case includes the situation when a transport buffer is simultaneously pushed and popped; the event and action are unchanged by this coincidence. |
| 2. An ACK signal is received from a processing core when a stream is in the not in the Urgent state. | B. The stream's deadline pending circuit is set to the negative state (e.g., indicating that the deadline value stored in the deadline register is invalid). This may be the normal action when a stream has been accepted for service. |
| 3. An ACK signal is received from a processing core when a stream is in the Urgent state. | C. The arithmetic adds the period of the stream from the period conversion circuit 422 to the deadline register 416. The deadline pending circuit 418 remains in its current state. This may be the action when a stream has been accepted for service, but may have another sample frame pending. |
| 4. A stream enters the urgent state when the stream's deadline pending circuit 418 is not in the affirmative state | D. The stream's deadline register acquires the value of the CPT 410 plus twice the period of the stream stored in the period conversion circuit 422. Additionally, the stream's deadline pending circuit 418 is set to |

TABLE 1-continued

| Event | Deadline Scheduler Action |
|---|---|
| | the affirmative state. This is a corrective action rectifying a race condition (the stream was accepted for service and its deadline cleared, but service was not completed when the stream became Urgent), and may also rectify an impossible state (the stream may need service but no deadline is pending). |

In various embodiments, these events are prioritized in accordance with a predetermined prioritization scheme. The prioritization scheme may be used to determine which action to take if multiple instances of the events 1-4 take place during a single clock cycle of the deadline scheduler 216. Certain events originating from certain processing cores may be prioritized over others. For example, in one embodiment, receipt of an ACK signal from the processing core 110 (e.g., a single sample processing core) is a highest priority event. As such, if an ACK from the processing core 110 is asserted for a stream during the current clock cycle and event 3 occurs, the arithmetic unit 408 performs the action C for the stream. If instead event 2 occurs, then action B is taken. Action B may not require the use of the arithmetic unit 408, so, in such a case, the arithmetic unit 408 may take additional actions with respect to other streams during that clock cycle.

A next highest priority event may be an ACK signal from another one of the processing cores (e.g., the processing core 112). Thus, under such a scheme, ACK signals received from the processing core 110 take precedent over ACK signals received form the processing core 112. As such, if both the processing cores 110 and 112 (e.g., by associated queue interfaces) provide ACK signals to the deadline scheduler 216 when streams are in the Urgent state (i.e., multiple instances of the event 3 occur simultaneously), the arithmetic unit may perform the action C for the stream serviced by the processing core 110 and not by the processing core 112. In such a case, the deadline scheduler 216 may store the stream identifier of the stream processed by the processing core 112 in a delayed stream register (not depicted) and a delay circuit 428 (e.g., flip flop) associated with the processing core 112 may be set. This enables the deadline scheduler 216 to take an appropriate action during the next clock cycle. In various embodiments, if any action is taken with respect to the stream processed by the processing core 112, the delay circuit 428 is reset.

If one or more streams are asserting condition 4, then the lowest numbered stream asserting condition 4 may have action D taken for it. If no streams are asserting condition 4, then the action request circuits of all streams may be examined. If one or more streams have action request circuits in the affirmative state (e.g., indicating condition 1 has occurred for them and not been serviced), then the lowest numbered stream asserting its action request may have action A taken for it. If no streams are asserting their action request circuits, then all streams may be examined for condition 1. If one or more streams are asserting condition 1, then the lowest numbered stream asserting condition 1 may have action A taken for it, and its action request circuit may be cleared. In all or some cases, any streams asserting condition 1 for which action (A) was not taken may have their action request flip-flops set.

As shown in FIG. 4, the deadline scheduler 216 includes processing core interfaces 404 and 406 through which output vectors are provided. Each output vector includes a SVC_REQ signal (indicating whether service is requested), a PRIOR_STREAM signal (including an identifier of a highest priority stream identified via the prioritization circuit 402) and a PTN_TIME flag (indicating whether a sample stored in an identified stream includes a presentation time). Additionally, ACK signals are provided via the processing cores 110 and 112 to the deadline scheduler 216.

In various embodiments, each processing core has the capability of setting a background service request flip-flop. If a service request in not asserted by the deadline scheduler 216 and the background service request flip-flop is, then the processing core (e.g., via a queue or I+R interface) may still request service with a background task identifier instead of the stream ID. If both the service request and the background service request are negated, then the queue interface stall the processing core or the I+R interface may not assert an interrupt.

An example sequence of actions taken by the deadline scheduler 216 are described in the following table:

TABLE 2

| Line | ACK | PUSH/POP | Quiescent | Urgent | Deadline Pending | New Deadline Pending | New Deadline Register |
|---|---|---|---|---|---|---|---|
| 1 | 1 | X (0) | X (0) | 0 | X (1) | 0 | unchanged |
| 2 | 1 | X (0) | X (0) | 1 | X (1) | 1 | Existing + Patent |
| 3 | 0 | X (0) | 1 | X(0) | X (0) | unchanged | unchanged |
| 4 | X (0) | X (0) | 1 to 0 | X(0) | X (0) | 1 | CPT + 2P |
| 5 | X (0) | 1 | 0 | 0 | X (0) | 1 | CPT + 2P |
| 6 | X (0) | 1 | X (0) | 1 to 0 | X(1) | unchanged | unchanged |
| 7 | 0 | 1 | 0 to 1 | X(0) | X(0) | unchanged | unchanged |
| 8 | 0 | 0 | 0 | X | X | unchanged | unchanged |
| 9 | 0 | 0 | X (0) | 0 | 0 | 1 | CPT + 2P |
| 10 | 0 | 0 | X (0) | 1 | 1 | unchanged | unchanged |

These actions may be described as follows. Line 1: An ACK signal is received regarding a stream not in the Urgent state. The processing core issuing the ACK is not simultaneously pushing or popping the corresponding transport buffer. Here, the action taken is to re-set the corresponding deadline pending circuit 518 (e.g., from 1 to 0). In line 2, if an ACK occurs regarding a stream is in the Urgent state, the deadline pending circuit 418 is maintained in the current state and the deadline value in the deadline register 416 is increased (e.g., by the arithmetic unit) by the period of the stream.

In line 3, when a stream remains in the Quiescent state, no service is requested for that stream and all else remains unchanged. As indicated by line 4, when such a stream exits the Quiescent state (e.g., indicating that a sample has been written thereto) the transport buffer may request service, and the deadline value is set to the incremental value of the CPT 410 plus twice the period of the stream (e.g., stored in the period conversion circuit 422). Alternatively, as indicated by line 5, the stream may remain in the quiescent state despite a push or pop from a corresponding transport buffer (e.g., in the case of a simultaneous push and pop of the transport buffer). In such a case, the simultaneous push/pop represents a service request, and the deadline value is set to the incremental value of the CPT 410 plus twice the period of the stream (e.g., stored in the period conversion circuit 422).

Line 6 represents what may occur when a stream exits the Urgent state due to a push or pop from a corresponding transport buffer. In such a case, there may remain a deadline pending (e.g., representing a sample stored in the transport buffer), but no service request, and all else is unchanged.

Line 7 represents what may occur when a stream enters the Quiescent state due to a push or pop from a corresponding transport buffer. Since the Quiescent state is entered, the deadline pending circuit 418 is set to an invalid state, and all else remains unchanged. If a stream is neither Quiescent nor Urgent and no pushes or pops occur, as represented by Line 8, there may or may not be a deadline pending, no service is requested, and all else is unchanged.

Lines 9 and 10 represent different circumstances for streams in an Urgent state. In line 9, there is no deadline pending, indicating that a deadline was accepted for service prior to the stream becoming Urgent, but that the transport buffer has not yet been pushed or popped and a new sample was stored therein placing the stream in the Urgent state. This requests service and the deadline value in the corresponding deadline value 416 is set to the incremental value of the CPT 410 plus twice the period of the stream (e.g., stored in the period conversion circuit 422). In line 10, the stream has a pending deadline. In such a case, the deadline remains unchanged.

The flowchart and block diagrams in various Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A multi-core audio processor comprising:
   a plurality of audio processing cores having differing capabilities;
   a plurality of buffers, wherein each buffer is configured to store a plurality of samples associated with a corresponding audio stream;
   a deadline scheduler including a plurality of deadline registers configured to store a plurality of deadline values for each audio stream; and
   a plurality of audio processing core interfaces coupling the plurality of audio processing cores to the deadline scheduler, each of the audio processing core interfaces associated with a corresponding audio processing core, wherein the plurality of deadline values indicate an order of processing of samples stored in the plurality of buffers by the plurality of processing cores.

2. The processor of claim 1, wherein each buffer of the plurality of buffers further comprises:
   a first output providing a first indication to the deadline scheduler if no samples are stored in the buffer; and
   a second output providing a second indication to the deadline scheduler if samples are stored in the buffer, wherein the order of processing is based on the first and second indiciations.

3. The processor of claim 1, wherein the deadline scheduler further comprises an arithmetic unit configured to update the plurality of deadline values by adding a period value to a corresponding deadline value.

4. The processor of claim 3, wherein the deadline scheduler further comprises a plurality of period conversion circuits, wherein each period conversion circuit is configured to store a period value for a corresponding audio stream, the period value based on a conversion of a sampling rate of the corresponding audio stream.

5. The processor of claim 1, wherein the plurality of buffers includes a plurality of input buffers and a plurality of output buffers.

6. The processor of claim 1, wherein the plurality of audio processing cores are configured to provide an acknowledgment (ACK) signal to the deadline scheduler via a corresponding processing core interface after writing data to or reading data from a buffer associated with an audio stream, the ACK signal identifying an audio stream associated with the buffer.

7. The processor of claim 1 further comprising:
   a set of routing multiplexers configured to route data between the plurality of audio processing cores and the plurality of buffers in accordance with a logical-to-physical address map configured to map subsets of the plurality of buffers to different audio streams; and
   a register module configured to store the logical-to-physical address map, wherein the audio processing cores are configured to provide a logical address of an audio stream to decoding logic associated with the set of routing multiplexers to enable a routing multiplexer to route data to or from a buffer associated with the audio stream to the audio processing cores.

8. The processor of claim 1, wherein the plurality of processing core interfaces include outputs providing indications identifying a highest priority audio stream to the plurality of audio processing cores, the highest priority audio stream identified by a corresponding compare tree configured to identify a minimum deadline value stored in the plurality of deadline registers.

9. The processor of claim 8, wherein the deadline scheduler further comprises a plurality of stopped stream detectors configured to provide interrupts to a system processing core when sample storage rates of corresponding buffers drop below predetermined levels.

10. A multi-core audio processor comprising:
    a plurality of audio processing cores having differing capabilities;

a plurality of deadline registers configured to store a plurality of deadline values indicating an ordering of processing of a plurality of audio streams by the plurality of audio processing cores, wherein a deadline scheduler is configured to update at least one of the plurality of deadline values per clock cycle; and a plurality of audio processing core interfaces communicably coupling the plurality of audio processing cores to a stream prioritization circuit, wherein each audio processing core interface is associated with a corresponding audio processing core, wherein the stream prioritization circuit comprises a plurality of compare trees, each compare tree configured to instruct a corresponding audio processing core to service an audio stream based on the plurality of deadline values via a corresponding audio processing core interface.

11. The processor of claim 10, further comprising a plurality of buffers, wherein each one of the plurality of buffers is configured to:

store a plurality of samples associated with a corresponding audio stream; and provide a processing priority indication for the audio stream to the deadline scheduler.

12. The processor of claim 11, wherein the deadline scheduler further comprises an arithmetic unit and wherein the plurality of audio processing cores are configured to provide an acknowledgment (ACK) signal to the arithmetic unit via a corresponding processing core interface after writing data to or reading data from a buffer associated with an audio stream, the ACK signal identifying an audio stream associated with the buffer.

13. The processor of claim 11, wherein the deadline scheduler further comprises a plurality of deadline pending circuits, each deadline pending circuit having a first state indicating that a deadline value stored in a corresponding deadline register is valid and a second state indicating that the deadline value is invalid, wherein the processor is configured to switch a deadline pending circuit between the first and second states in response to receiving an ACK signal or receiving a processing priority indication from a corresponding buffer, wherein a compare tree only instructs an audio processing core to service an audio stream if a corresponding deadline pending circuit is in the valid state.

14. The processor of claim 11, further comprising a plurality of selection registers, each selection register storing an identifier for a corresponding audio stream, the identifier selecting one of the plurality of audio processing cores, wherein a compare tree only instructs an audio processing core to service an audio stream if a corresponding selection register stores an identifier associated with the corresponding processing core.

15. The processor of claim 11, wherein the plurality of buffers includes a receiving buffer configured to receive data and a transmittal buffer configured transmit data, wherein the processing priority indications provided by the plurality buffers include a full signal from the receiving buffer and an empty signal from the transmittal buffer.

16. The processor of claim 15, wherein, in response to receiving a service indication from an audio processing core interface identifying an audio stream, the processor is configured to set a deadline pending circuit associated with the audio stream to the invalid state.

17. A multi-core audio processor comprising:

a plurality of audio processing cores having different processing capabilities, at least one of the audio processing cores configured to perform block data processing and at least one of the audio processing cores configured to perform single sample data processing;

an audio transport block including a first plurality of audio interfaces configured to communicate data of a first plurality of audio channels and a second plurality of audio interfaces configured to communicate data of a second plurality of channels;

a first plurality of buffers, at least one of the first plurality of buffers associated with each of the first plurality of audio interfaces, the processor configurable to synchronously store data of the first plurality of audio channels in the first plurality of buffers as a first audio stream;

a second plurality of buffers, at least one of the second plurality of buffers associated with each of the second plurality of audio interfaces, the processor configurable to synchronously store data of the second plurality of audio channels in the second plurality of buffers as a second audio stream; and a deadline scheduler including a first deadline register configured to store a first deadline value for a first processing task associated with the first audio stream and a second deadline register configured to store a second deadline value for a second processing task associated with the second audio stream, the processor configured to update an order in which the first and second processing tasks are performed based on based on amounts of data stored in the first and second pluralities of buffers.

18. The multi-core audio processor of claim 17, wherein the deadline scheduler further comprises first and second period conversion circuits configured to convert programmed sampling rates of the first and second audio streams into first and second period values and store the period values, wherein the deadline scheduler updates the order based on the stored period values.

19. The multi-core audio processor of claim 18, wherein the deadline scheduler further comprises an arithmetic unit configured to add the stored period values or multiples thereof to the first and second deadline values in response to receiving indications of amounts of data stored in the first and second pluralities of buffers.

20. The multi-core audio processor of claim 18, wherein the deadline scheduler further comprises a first stopped stream detector and a second stopped stream detector configured to provide interrupts to a system processing core when data storage rates of the first and second pluralities of buffers drop below the programmed sampling rates.

* * * * *